US010348681B2

(12) United States Patent
Gearhart et al.

(10) Patent No.: US 10,348,681 B2
(45) Date of Patent: Jul. 9, 2019

(54) CENTRALIZED SECURE OFFLOAD OF SECURITY SERVICES FOR DISTRIBUTED SECURITY ENFORCEMENT POINTS

(75) Inventors: Curtis M. Gearhart, Raleigh, NC (US); Christopher Meyer, Cary, NC (US); Linwood H. Overby, Jr., Raleigh, NC (US); David J. Wierbowski, Owego, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1189 days.

(21) Appl. No.: 11/626,458

(22) Filed: Jan. 24, 2007

(65) Prior Publication Data

US 2008/0178254 A1    Jul. 24, 2008

(51) Int. Cl.
H04L 29/06    (2006.01)
(52) U.S. Cl.
CPC .......... *H04L 63/0209* (2013.01); *H04L 63/04* (2013.01); *H04L 63/0485* (2013.01); *H04L 63/0823* (2013.01); *H04L 63/1408* (2013.01); *H04L 2209/76* (2013.01)
(58) Field of Classification Search
CPC ......... H04L 63/02; H04L 63/20; H04L 63/10; H04L 63/14; H04L 63/30; G06F 21/03
USPC ............... 726/1–15, 22–30; 709/217–229
See application file for complete search history.

(56) References Cited

U.S. PATENT DOCUMENTS 6,324,648 B1 * 11/2001 Grantges, Jr. .................. 726/12
6,357,010 B1 * 3/2002 Viets et al. ...................... 726/4
6,510,464 B1 * 1/2003 Grantges et al. ............ 709/225
6,868,388 B1    3/2005 Millsap et al.
2001/0052013 A1 * 12/2001 Munguia et al. ............ 709/225
2002/0078379 A1 * 6/2002 Edwards et al. ............ 713/201
2002/0108059 A1    8/2002 Canlon et al.
2003/0126230 A1    7/2003 Donatelli et al.
2003/0167410 A1 * 9/2003 Rigstad et al. .............. 713/201

(Continued)

OTHER PUBLICATIONS

Demchenko, Yuri, et al. "Web services and grid security vulnerabilities and threats analysis and model." Proceedings of the 6th IEEE/ACM international workshop on grid computing. IEEE Computer Society, 2005. (Year: 2005).*

*Primary Examiner* — Madhuri R Herzog
(74) *Attorney, Agent, or Firm* — Cuenot, Forsythe & Kim, LLC

(57) ABSTRACT

Embodiments of the present invention provide methods, systems and computer program products for the centralized, secure offloading of security services for distributed security enforcement points. In an embodiment, a network data processing system can be configured for centralized secure offload of security services for distributed security enforcement points and can include a set of security enforcement points controlling communication flows between devices in different less trusted zones of protection. The system also can include a security server communicatively coupled to the security enforcement points and hosting security services logic disposed in a more trusted zone of protection. Each of the security enforcement points can include an interface to the security services logic and program code enabled to offload security related services processing through the interface to the security services logic disposed in the more trusted zone of protection.

15 Claims, 2 Drawing Sheets

(56) References Cited

U.S. PATENT DOCUMENTS

2005/0246447 A1* 11/2005 Smidt et al. .................. 709/229
2005/0251855 A1* 11/2005 Brandstatter ................... 726/12

* cited by examiner

CENTRALIZED SECURE OFFLOAD OF SECURITY SERVICES FOR DISTRIBUTED SECURITY ENFORCEMENT POINTS

CROSS-REFERENCE TO RELATED APPLICATIONS

This application contains subject matter related to subject matter disclosed in copending U.S. patent application Ser. No. 11/626,513, filed on Jan. 24, 2007.

BACKGROUND OF THE INVENTION

Field of the Invention

The present invention relates to the field of network security and more particularly to the field of security services management for distributed security enforcement points.

Description of the Related Art

Internet security has increasingly become the focus of both corporate and home computer users who participate in globally accessible computer networks. In particular, with the availability and affordability of broadband Internet access, even within the small office home office environment, many computers and small computer networks enjoy continuous access to the Internet. Notwithstanding, continuous, high-speed access is not without its price. Specifically, those computers and computer networks which heretofore had remained disconnected from the security risks of the Internet now have become the primary target of malicious Internet crackers and script kiddies, collectively referred to as "malicious intruders".

Notably, many such unauthorized intruders continuously scan the Internet for Internet Protocol (IP) addresses and ports of vulnerable computers communicatively linked to the Internet. At the minimum, those vulnerable computers can experience nuisance damage such as unauthorized file access, file deletion or file modification or defaced Web pages. Yet, at the other extreme, for the unsuspecting end-user their computer can become the staging area for "zombies" with which more malicious attacks can be launched resulting in the crippling of whole segments of the Internet. Of note, damage can result not only from the external actions of a malicious intruder, but also from the unsuspecting and unintentional actions of an internal, authorized user who either has accessed the assigned authorization to that user, or who unsuspectingly has become the proxy for an external, malicious force.

To combat the threat of malicious hacking, information technologies have devised complicated computing architectures designed to selectively limit access to different network resources according to the type of resource accessed and the identity of the user attempting access to the resource. Generally, network security measures deployed to combat malicious hacking can be broadly grouped into perimeter defenses, end-point defenses and intermediate security enforcement points. Perimeter defenses typically refer to firewall and other restrictive technologies deployed at the perimeter of the network. By comparison, end-point defenses generally refer to application level, client-side mechanisms such as client-side anti-virus software and software implemented personal firewalls.

Security enforcement points form the balance of the requisite security measures within a computing network. Security enforcement points refer to both software and hardware network and host resources that enforce a security policy, including gateway mechanisms, within the network that separate a less-trusted portion or zone of the network from a more-trusted portion or zone of the network. Typically, security enforcement points are implemented in network and host infrastructure according to tiers of layers. The layering approach of the tiered architecture is intended to isolate certain services from direct exposure to users of the services based upon the sensitivity of the data exposed within the tier and the perceived risk of exposure from a set of users.

While data can be protected by a conventional tiering approach, security enforcement points with sensitive data relating to security often are located in relatively hostile zones in the network. In addition, as security enforcement points can be aggregation points for traffic, continuous availability of the systems in these relatively hostile zones can be critical. Finally, in order to control the operation of the network and to receive management data such as security events, one or more management nodes in relatively secure zones that have direct connectivity must all maintain an awareness of the multitude of security enforcement points and also must have direct connectivity to the security enforcement points—even those in hostile zones.

BRIEF SUMMARY OF THE INVENTION

Embodiments of the present invention address deficiencies of the art in respect to security and provide a novel and non-obvious method, system and computer program product for the centralized, secure offloading of security services for distributed security enforcement points. In an embodiment of the invention, a data processing system can be configured for centralized secure offload of security services for distributed security enforcement points. The system can include a set of security enforcement points controlling communication flows between devices in different less trusted zones of protection.

The system also can include a security server communicatively coupled to the security enforcement points and hosting security services logic disposed in a more trusted zone of protection. In particular, each of the security enforcement points can include an interface to the security services logic and program code in the more trusted zone of protection. Finally, the system optionally can include an autonomic security manager communicatively coupled to the security services logic and program code and configured to receive monitoring information about the security enforcement points from the security services logic.

In another embodiment of the invention, a method for centralized secure offload of security services for distributed security enforcement points can be provided. The method can include receiving a request for establishing communications from one zone of protection through another zone of protection in a security enforcement point in a less trusted zone of protection, invoking security services in a more trusted zone of protection to handle the request, and establishing the communications in the security enforcement point with a result provided by the security services. For instance, invoking security services in a more trusted zone of protection to handle the request can include invoking digital signature verification and signing services in the more trusted zone of protection with information obtained from the request.

In one aspect of the embodiment, the method also can include further invoking security services in the more trusted zone of protection to receive policy services for the security enforcement point, and configuring the security enforcement point in the less trusted zone of protection with the policy services received from the security services of the more trusted zone of protection. In another aspect of the embodiment, the method also can include further invoking security services in the more trusted zone of protection to receive monitoring services for the security enforcement point, providing security events to an autonomic security manager via the monitoring services, and analyzing the security events in the autonomic security manager. Finally, in yet another aspect of the embodiment, the method also can include further invoking security services in the more trusted zone of protection to receive business resilience services for the security enforcement point, and restoring the security enforcement point with settings provided by the business resilience services in the more trusted zone of protection.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for centralized secure offload of security services for distributed security enforcement points. In accordance with an embodiment of the present invention, the services for a security enforcement point in a network topology can be separated from the security enforcement point within different zones of protection, albeit the security enforcement point can be communicatively coupled to the services for the security enforcement point over a private, secure connection. The security enforcement point can be disposed within a less trusted zone of protection, whereas the services for the security enforcement point can be disposed within a more trusted zone of protection. In this way, critical information utilized in providing security enforcement point services can remain in a trusted zone of protection to provide a higher level of security.

Figure 1:
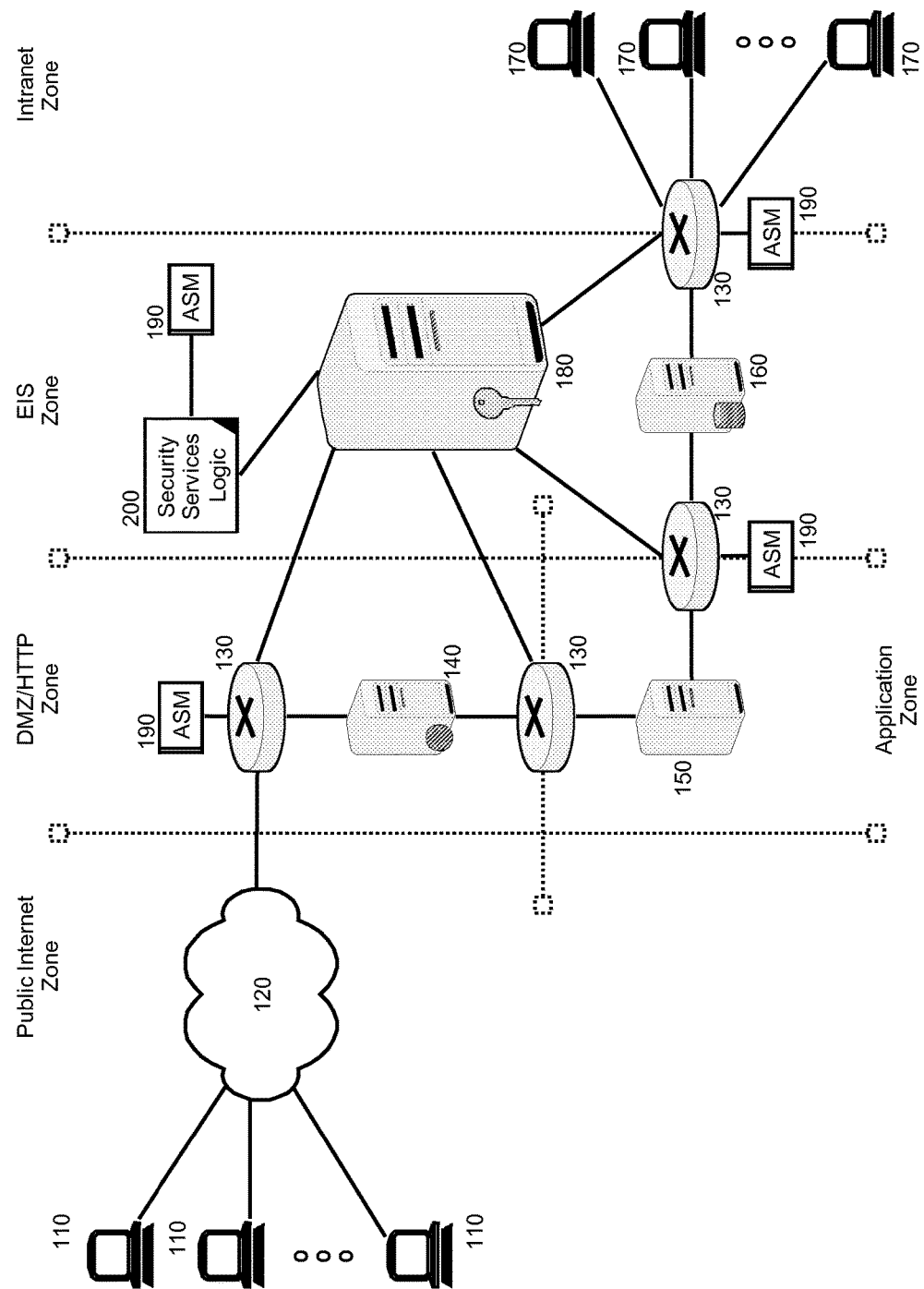
FIG. 1 is a schematic illustration of a network architecture configured for centralized secure offload of security services for distributed security enforcement points.

In illustration, FIG. 1 is a schematic illustration of a network architecture configured for centralized secure offload of security services for distributed security enforcement points. As shown in FIG. 1, the network architecture can include multiple zones of protection ranging from a public Internet zone to an Intranet zone. The zones of protection also can include a demilitarized zone, an application zone and an enterprise information system (EIS) zone. The public Internet zone of protection can provide a less trusted zone of protection, whereas the EIS zone of protection and the Intranet zone of protection can provide a more trusted zone of protection, as it is well-known in the art.

The public Internet zone of protection can abut the demilitarized zone of protection such that computing clients 110 in the public computing space can establish communicative sessions with a content server 140 over a global computer communications network 120, for example the global Internet. A security enforcement point 130, however, can be disposed in the path of communications between the clients 110 and the content server 140 so as to monitor, regulate and limit communications flowing between the clients 110 and the content server 140 and can, in fact, be disposed within any of the clients 100 or the content server 140. In this regard, the security enforcement point can include security enforcement logic configured to requisition security services for monitoring, regulating, and limiting the communications flowing between the clients 110 and the content server 140.

Exemplary services include a policy service, a monitoring service, a digital signature and verification service, and a business resilience service. Generally speaking, a policy service can include the operational parameters for controlling the operation of intrusion detection and prevention systems, firewalls, Internet protocol security encryption protocol implementation, and secured session negotiation. A monitoring service, by comparison, accepts requests from autonomic security managers to control, display and analyze security enforcement points including the analysis of events arising in the security enforcement points. The digital signature and verification service can store certificates and private keys and process requests in order to create and verify digital signatures on behalf of the security enforcement points. Finally, business resilience services include the persistence of recovery information ordinarily stored in the security enforcement point as the recovery information relates to the re-establishment of a secure environment in the event of a communications or network fault.

The content server 140 further can be coupled to one or more application servers 150 in an application zone of protection. The application servers 150 (only a single application server shown for the sake of illustrative simplicity), can provide application logic accessible through a user interface provided by the content server 140. As before, a security enforcement point can be disposed in the path of communications between the content server 140 and the application servers 150 and can include security enforcement logic configured to requisition security services for monitoring, regulating, and limiting the communications flowing between the content server 140 and the application servers 150.

The application servers 150 can be coupled to one or more data servers 160 providing enterprise information services within an EIS zone of protection. The data servers 160 can provide entity information services and can range from a basic database that can be queried by logic executing within the application servers 150, to complete information systems that can be accessed by logic executing within the application servers 150. Again, a security enforcement point 130 can be disposed in the path of communications between the application servers 150 and the data servers 160 and can include security enforcement logic configured to requisition security services for monitoring, regulating, and limiting the communications flowing between the application servers 150 and the application servers 160.

The data servers 160 also can be coupled to internal Intranet clients 170 disposed in an Intranet zone of protection. The Intranet clients 170 can be viewed as more trustworthy than computing clients 110 and can access the services of the data servers 160 directly through a security enforcement point 130. Yet, as before, the security enforcement point 130 can include security enforcement logic configured to requisition security services for monitoring, regulating, and limiting the communications flowing between the Intranet clients 170 and the data servers 160.

Notably, one or more security servers 180 can be disposed in a more trusted zone of protection of the architecture, for instance, within the EIS zone of protection. The security servers 180 can be communicatively coupled to each of the security enforcement points 130. The security servers 180 can include security services logic 200. The security services logic 200 can include program code operable to monitor, to regulate and to limit communications flows through communicatively coupled security enforcement points, albeit the security services logic 200 resides within a different, more trusted zone of protection from that of coupled security enforcement points 130.

In this regard, a communications path can subsist between each security enforcement point 130 and the security services logic 200. As any of the security enforcement points 130 require security enforcement services for monitoring, regulating, or limiting communication flows through the security enforcement points 130, the security enforcement points 130 can offload the requisite security services to the security services logic 200. The security services within the security service logic 200 can be performed and results returned to the requesting security enforcement points 130. Additionally, the security services logic 200 can provide an interface to autonomic security managers 190 to control and receive security management data for the security enforcement points 130. In either case, the security enforcement points 130 can perform security services on transient communications flows while limiting the exposure of critical data utilized in performing security services.

Figure 2:
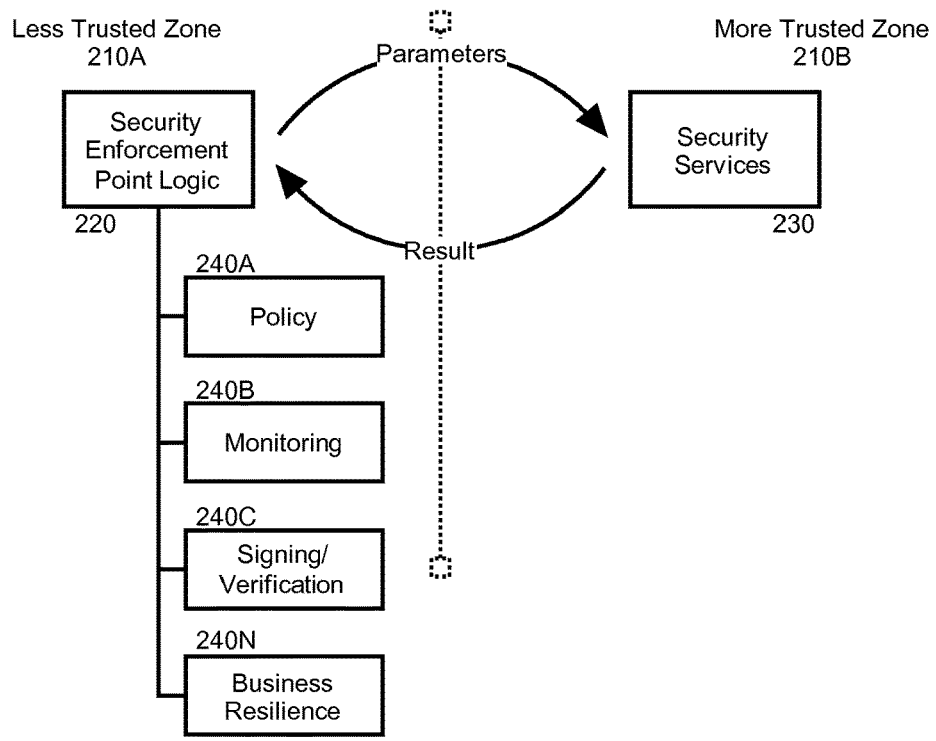
FIG. 2 is a block diagram illustrating a process for centralized secure offload of security services for distributed security enforcement points; and, FIG. 3 is a flow chart illustrating a process for centralized secure offload of security services for distributed security enforcement points.

In further illustration, FIG. 2 is a block diagram illustrating a process for centralized secure offload of security services for distributed security enforcement points. As a general operating principle of the invention, at least two zones of protection 210A, 210B can be established in a network architecture—a less trusted zone of protection 210A and a more trusted zone of protection 210B. Different security enforcement points can be disposed about the less trusted zones of protection 210A and each can include security enforcement point logic 220. By comparison, the security services 230 required for use by the security enforcement point logic 220 can be positioned in the more trusted zone of protection 210B.

The security enforcement point logic 220 can requisition several security related services from the security services 230 through an application programming interface (API) provided by the security services 230. Exemplary APIs can include an API for policy enforcement 240A, an API for monitoring 240B, an API for digital certificate signing and verification 240C, and an API for business resilience 240N. In the course requisitioning security related services from the security services 230, the security enforcement point logic 220 can provide to the security services 230 pertinent data received or generated by the security enforcement point logic 220. In return, the security services 230 can provide resulting data to the security enforcement point logic 220.

Figure 3:
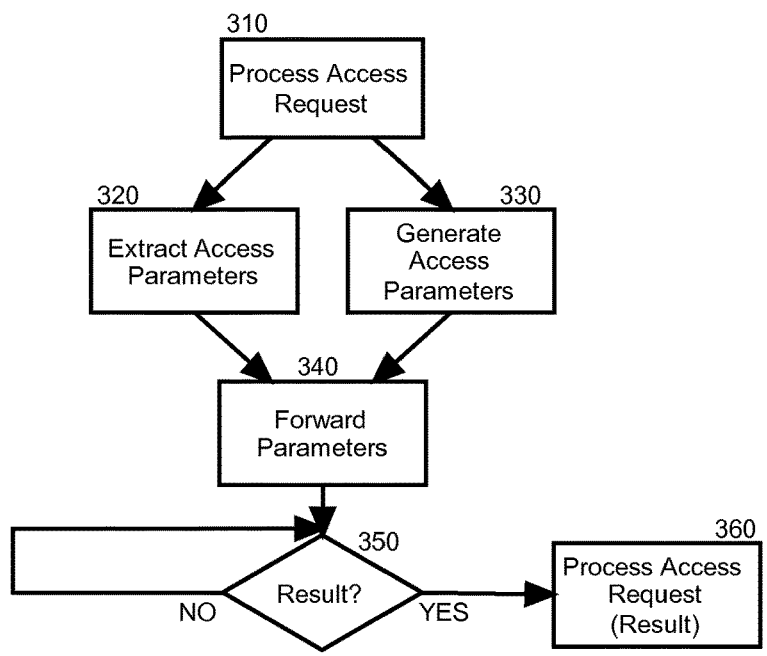

In yet further illustration, FIG. 3 is a flow chart illustrating a process for centralized secure offload of security services for distributed security enforcement points. Beginning in block 310, an access request can be received in a security enforcement point. The access request generally can relate to the passage of data through the security enforcement point from one zone of protection in a network architecture to another zone of protection. Additionally, the access request either can relate to the regulation of the flow of data through the security enforcement point, or the monitoring of the flow of data through the security enforcement point.

In block 320, pertinent access parameters can be extracted from the request, such as the network address of the requester or the contents of a payload, or a key or authentication code provided within the request. Likewise, to the extent required, in block 330, access parameters can be generated within the security enforcement point in response to the request. Thereafter, in block 340 both extracted and generated parameters can be provided to security services logic remotely within a different and more trusted zone of protection. In decision block 350, a result can be received over the remote connection from the security services logic, and in block 360 the request can be processed in view of the result to provide security related services for the request.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A security server, comprising
an interface connected to:
    a first security enforcement point disposed between a public zone of protection and a demilitarized zone of protection that is more trusted than the public zone of protection,
    a second security enforcement point disposed in a communication path between a content server, within the demilitarized zone of protection, and an application server in an application zone of protection,
    a third security enforcement point disposed in a communication path between the application server and a data server in an enterprise zone of protection,
    a fourth security enforcement point disposed in a communication path between the data server and an Intranet client disposed in an Intranet zone of protection; and
a hardware processor configured to execute the following executable operations:
    obtaining, from access requests received via the interface from each of the security enforcement points, respective access parameters, and
    performing respective security services using the respective access parameters to generate respective security results, and
    forwarding, via the interface, the respective security results to the security enforcement points, wherein
the security server is disposed within the enterprise zone of protection,
each of the security enforcement points are configured to regulate communication flows between devices respectively disposed within zones of protection separated by a particular security enforcement point,
the security services are performed on the communication flows between the devices, and
the respective security results are forwarded to the security enforcement points to be used in performing the security services on the communications flows between the devices.

2. The security server of claim 1, wherein
each of the security enforcement points includes security logic configured to generate an access request relating to a passage of data through a respective security enforcement point and between different zones of protection.

3. The security server of claim 2, wherein
the access request relates to regulation of the data through the respective security enforcement point.

4. The security server of claim 2, wherein
the access request relates to monitoring the data through the respective security enforcement point.

5. The security server of claim 1, wherein
the security services include key public/private key services.

6. A computer-implemented method within a security server, comprising:
receiving, via an interface within the security server, information from:
    a first security enforcement point disposed between a public zone of protection and a demilitarized zone of protection that is more trusted than the public zone of protection,
    a second security enforcement point disposed in a communication path between a content server, within the demilitarized zone of protection, and an application server in an application zone of protection,
    a third security enforcement point disposed in a communication path between the application server and a data server in an enterprise zone of protection,
    a fourth security enforcement point disposed in a communication path between the data server and an Intranet client disposed in an Intranet zone of protection; and
obtaining, from access requests received via the interface from each of the security enforcement points, respective access parameters, and
performing respective security services using the respective access parameters to generate respective security results, and
forwarding, via the interface, the respective security results to the security enforcement points, wherein
the security server is disposed within the enterprise zone of protection,
each of the security enforcement points are configured to regulate communication flows between devices respectively disposed within zones of protection separated by a particular security enforcement point,
the security services are performed on the communication flows between the devices, and
the respective security results are forwarded to the security enforcement points to be used in performing the security services on the communications flows between the devices.

7. The method of claim 6, wherein
each of the security enforcement points includes security logic configured to generate an access request relating to a passage of data through a respective security enforcement point and between different zones of protection.

8. The method of claim 7, wherein
the access request relates to regulation of the data through the respective security enforcement point.

9. The method of claim 7, wherein
the access request relates to monitoring the data through the respective security enforcement point.

10. The method of claim 6, wherein
the security services include key public/private key services.

11. A computer program product, comprising:
a hardware storage device having stored therein computer-readable program code,
the computer-readable program code, which when executed by a security server, causes the security server to perform:
receiving, via an interface within the security server, information from:
    a first security enforcement point disposed between a public zone of protection and a demilitarized zone of protection that is more trusted than the public zone of protection,
    a second security enforcement point disposed in a communication path between a content server, within the demilitarized zone of protection, and an application server in an application zone of protection,
  a third security enforcement point disposed in a communication path between the application server and a data server in an enterprise zone of protection,
  a fourth security enforcement point disposed in a communication path between the data server and an Intranet client disposed in an Intranet zone of protection; and
obtaining, from access requests received via the interface from each of the security enforcement points, respective access parameters, and
performing respective security services using the respective access parameters to generate respective security results, and
forwarding, via the interface, the respective security results to the security enforcement points, wherein
the security server is disposed within the enterprise zone of protection,
each of the security enforcement points are configured to regulate communication flows between devices respectively disposed within zones of protection separated by a particular security enforcement point,
the security services are performed on the communication flows between the devices, and
the respective security results are forwarded to the security enforcement points to be used in performing the security services on the communications flows between the devices.

12. The method of claim 11, wherein
each of the security enforcement points includes security logic configured to generate an access request relating to a passage of data through a respective security enforcement point and between different zones of protection.

13. The method of claim 12, wherein
the access request relates to regulation of the data through the respective security enforcement point.

14. The method of claim 12, wherein
the access request relates to monitoring the data through the respective security enforcement point.

15. The method of claim 11, wherein
the security services include key public/private key services.

* * * * *